United States Patent

Kwan et al.

[11] Patent Number: 5,433,803
[45] Date of Patent: Jul. 18, 1995

[54] LAMINATION OF VEGETABLE MATTER

[75] Inventors: Edward Kwan; John P. Le Sands, both of Queensland, Australia

[73] Assignee: Paul N. Van Draanen, The Gap, Australia

[21] Appl. No.: 897,692

[22] Filed: Jun. 12, 1992

[51] Int. Cl.⁶ .............................................. A01G 5/06
[52] U.S. Cl. ................................. 156/57; 156/87; 156/285; 156/209; 156/219; 428/17; 428/24
[58] Field of Search ................ 156/57, 286, 285, 87, 156/583.3, 219, 209; 428/17, 22, 24; 434/295, 296, 297

[56] References Cited

U.S. PATENT DOCUMENTS

| | | | |
|---|---|---|---|
| 3,255,476 | 6/1966 | Dawson | 156/583.3 |
| 3,298,881 | 1/1967 | Higley | 434/296 |
| 3,723,220 | 3/1973 | Scher et al. | 156/219 |
| 4,217,157 | 8/1980 | Stoltze et al. | 156/286 |
| 4,636,275 | 1/1987 | Norell | 156/583.3 X |
| 4,737,208 | 4/1988 | Bloechle et al. | 156/583.3 X |
| 4,885,037 | 12/1989 | Ohkubo | 156/57 |
| 5,119,571 | 6/1992 | Beasky | 34/86 X |

FOREIGN PATENT DOCUMENTS

| | | | |
|---|---|---|---|
| 0487736 | 6/1992 | European Pat. Off. | 156/57 |
| 60-19600 | 1/1985 | Japan | 156/57 |

Primary Examiner—Jeff H. Aftergut
Attorney, Agent, or Firm—Foley & Lardner

[57] ABSTRACT

Flowers or leaves are dried for 3-7 days under controlled atmospheric conditions, and under pressure, between absorbent sheets. The dried material is placed on a backing sheet and covered by a layer of laminating plastic. By the application of pressure, heat and vacuum, the air between the laminating and backing sheets is removed, the laminating sheet moulds around the dried material and is laminated to the backing sheet.

10 Claims, 2 Drawing Sheets

LAMINATION OF VEGETABLE MATTER

BACKGROUND OF THE INVENTION

1. Field of the Invention

THIS INVENTION relates to the lamination of vegetable matter. The term "vegetable matter" shall be used to include plants, flowers, leaves, grasses and other flora.

2. Prior Art

There have been many attempts to laminate vegetable matter between backing materials (e.g. paper, cardboard, timber) and transparent plastics sheeting e.g. on greeting cards. The results have been less than satisfactory.

The laminating processes have tended to flatten the vegetable matter and so the three-dimensional effect of e.g. the flowers, on the backing sheet, has been lost. In addition, as the air has not been removed from between the laminating sheet and the backing sheet, the vegetable matter degrades fairly quickly. Finally, the conventional laminating processes result in a loss of color in the vegetable matter, particularly with flowers.

SUMMARY OF THE PRESENT INVENTION

It is an object of the present invention to provide an improved method for the lamination of vegetable matter.

It is a preferred object to provide a method where the colors, three-dimensional appearance and natural look of the vegetable matter is retained.

It is a further preferred object to provide a method which is relatively simple.

Other preferred objects of the present invention will become apparent from the following description.

In one aspect, the present invention resides in a method of laminating vegetable matter (as hereinbefore defined) between a backing material and a laminating sheet including the steps of:

predrying the vegetable matter in a temperature and humidity controlled environment;

placing the dried vegetable matter on the backing material in a desired pattern and placing the laminating sheet over the vegetable matter; and applying pressure and heat to the assembly under controlled conditions to cause the laminating sheet to be laminated to the backing material.

The pressure may be a negative pressure or vacuum; a positive pressure (applied via a resilient material and a weight or press platen); or a combination of both.

Preferably the vegetable matter is predried between paper or cardboard sheets under pressure for 3–7 days, or at least until dried. Preferably the relative humidity is below 60%. Preferably the temperature is maintained in the range of 20°–40° C.

The backing material may comprise paper, cardboard, timber or other suitable material.

The laminating sheet is preferably a plastics or synthetic material sheet which is preferably transparent or semi-opaque. Preferably the laminating sheet is of the thermoseal type with adhesive on its inner face, the adhesive being released by heat and/or pressure.

The resilient material preferably comprises a sheet of fine texture Thermal Foam (or sponge rubber or plastics) which will press the laminating sheet onto the vegetable matter without compressing the latter.

Preferably the assembly is placed on a flat surface, which forms the lower platen of the laminating press. Preferably the upper platen presses down on the resilient sheet (ie. the Thermal Foam) to cause the laminating sheet to mold neatly around the vegetable matter, the laminating sheet being laminated by heat or pressure onto the backing material.

Preferably the pressure is applied for one to five minutes.

Preferably the heat is evenly applied to the assembly by heating at least one of the platens and preferably the heat is applied in the temperature range 100°–160° C., more preferably 80°–140° C.

Preferably, the pressure and temperature are applied until the lamination temperature of the laminating sheet has been reached and the texture of the resilient sheet has been imprinted onto the laminating sheet to remove most of the gloss therefrom i.e. to produce a non-reflective effect.

Preferably, the resilient sheet molds the laminating sheet onto the vegetable matter and removes the air between the backing material and the laminating sheet.

The laminating sheet may also be applied using vacuum techniques to remove the air from the assembly.

In a second aspect, the present invention resides in a greeting card or laminated assembly produced by the method hereinbefore described.

BRIEF DESCRIPTION OF THE DRAWINGS

To enable the invention to be fully understood, a preferred embodiment will now be described, with reference to the accompanying drawings, in which.

DETAILED DESCRIPTION OF PREFERRED EMBODIMENTS

Figure 1A:
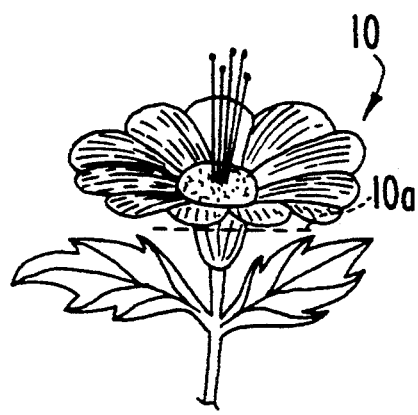
FIG. 1 is a perspective view of vegetable material suitable for lamination by the method of the present invention.
Figure 1B:
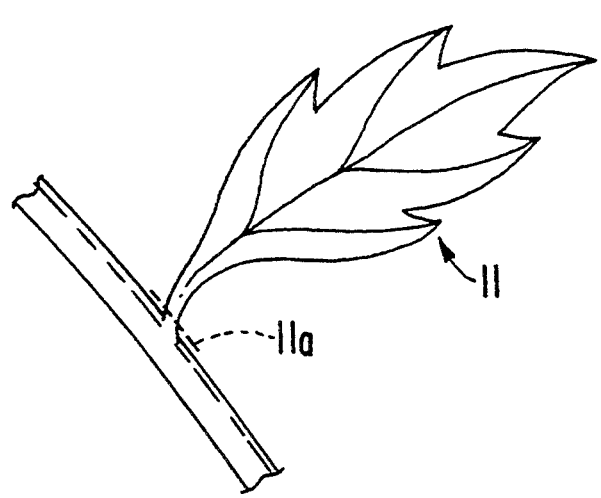
Figure 4:
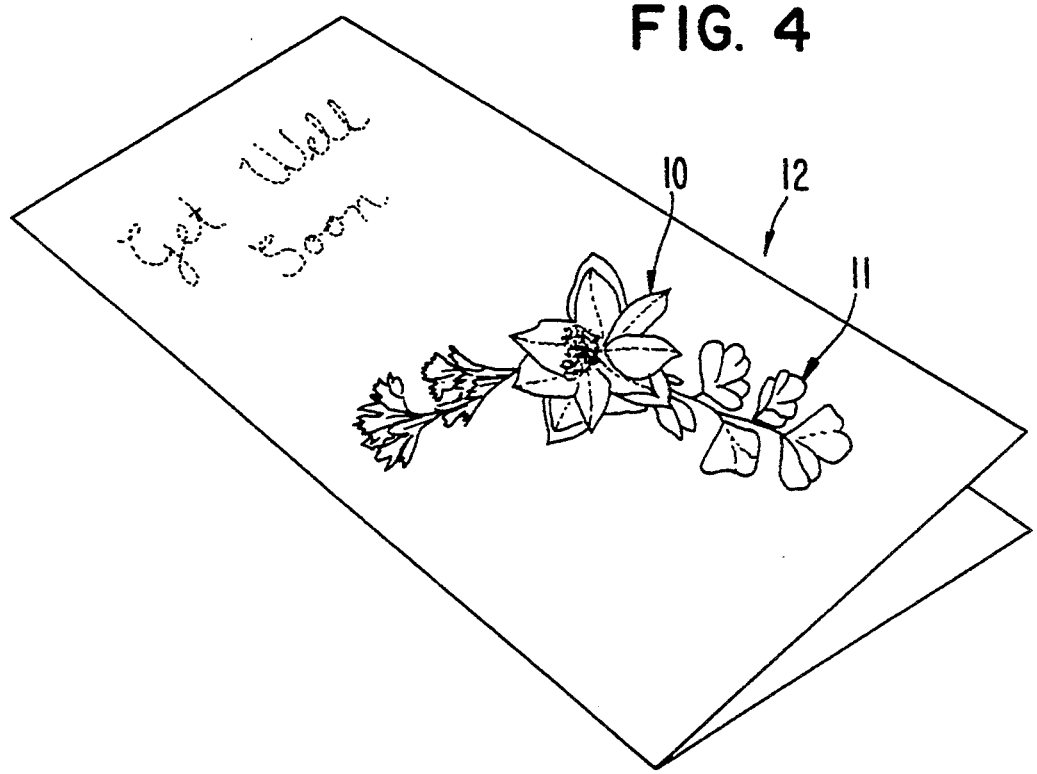
FIG. 4 is a perspective view of a greeting card with material laminated by the present method.

Referring to FIG. 1, flowers 10 and leaves 11 to be laminated onto the front of a greeting card 12 (see FIG. 4) are selected and are laid flat between the cardboard and/or paper sheets of a drying press 13. The flowers 10 and leaves 11 are chosen from living plants, and excess flower buds, stems, branches, twigs and like material which will create net excess bulk during lamination and/or excess moisture retention during drying are removed (eg. by cutting along lines 10a, 11a).

Figure 2:
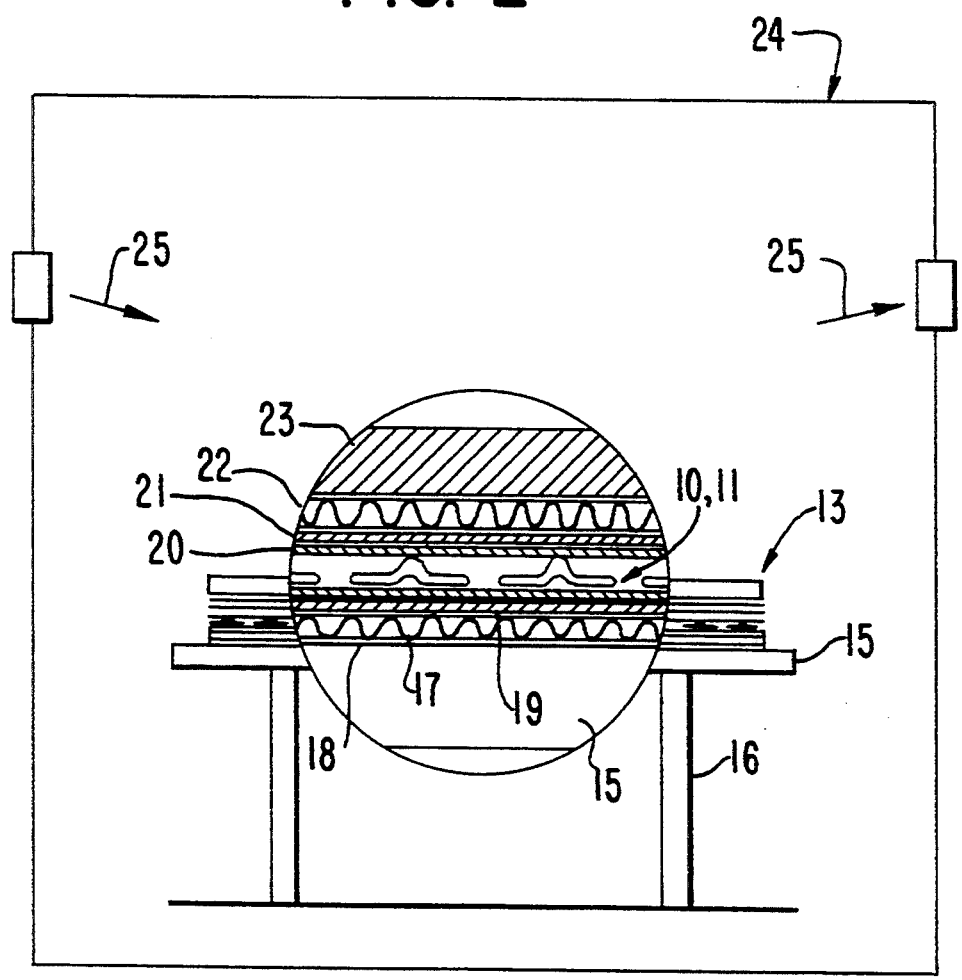
FIG. 2 is a schematic sectional view of the drying apparatus.

Referring to FIG. 2, the drying press 13 has a table top (or bottom platen) 15, on legs 16, on which are assembled a sheet of cardboard 17, a sheet of newspaper 18, a sheet of blotting paper 19, the flowers 10/leaves 11, blotting paper 20, newspaper 21, cardboard 22 and a weighted plate (or top platen) 23. The press 13 is placed in a temperature controlled drying room 24 with an air flow 25.

The flowers and leaves are dried for 3–60 days under controlled conditions, with the relative humidity maintained in the room 24 in the range of 25–65% (preferably 30%) and the temperature maintained in the range of 15°–40° C. (preferably 18°–21° C.). The drying time will be dependent on the type of vegetable matter being dried and the temperature/humidity in the room. A minimum drying time of 7 days is preferred.

The drying process must involve removal of moisture from the flowers 10/leaves 11 with minimum delay for colour retention. The removed moisture must be expelled from the drying room 24 and not be allowed to recirculate.

Air flow is vital to the drying process and it is strongly preferred that perforated or corrugated cardboard 17, 22 be used as spacers in the drying press 13 to ensure airflow as close as possible to the flowers 10/leaves 11 being dried.

Figure 3:
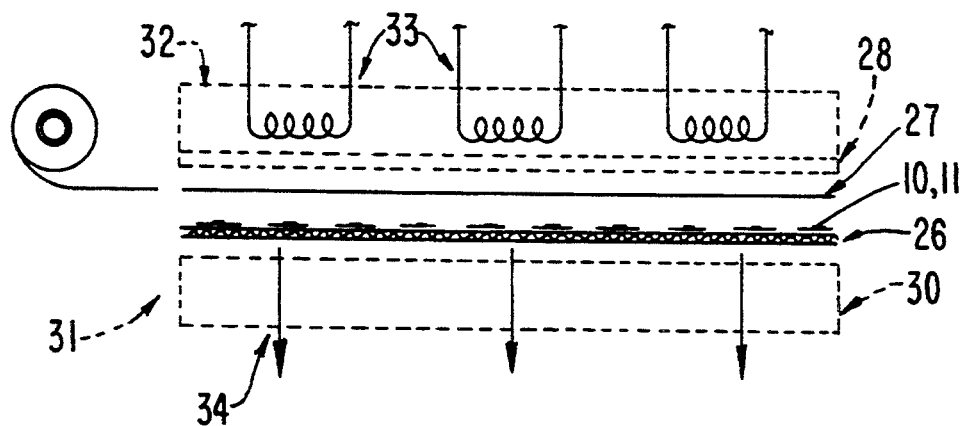
FIG. 3 is a schematic side view of the lamination slip.

Referring now to FIG. 3, when the material has been dried, it is removed from the drying press 13 and is laid out in the desired pattern on a sheet of stiff paper or card 26, which will form the body of the greeting card 12. (The paper or card may be substituted by glass, plastic, metal sheet, marble, stone, or other suitable backing material.)

Transparent thermoseal plastic laminating sheet 27 is placed over the dried material 10, 11 and card, with its adhesive face directed towards the card.

A layer of fine textured thermal foam 28 may then be laid over the laminating sheet.

The assembly is placed on the flat lower platen 30 of a laminating press 31, with the stiff paper or card 26 lowermost, and the upper platen 32 is then brought down onto the assembly to apply pressure thereto.

One of the platens is heated by heating coils 33 to between 90° C. and 140° C. (depending on the type of vegetable material being laminated) for a laminating time between 2 and 5 minutes, to ensure that the lamination temperature of the adhesive has been reached and that the texture of the thermal foam has been imprinted in the surface of the laminating sheet to generate a non-reflective surface, and the air has been extracted by vacuum suction 34 and pressure.

The combination of the vacuum, temperature, pressure and resilience of the thermal foam ensures that the laminating sheet molds around the flowers and leaves, without flattening them, and all of the air is expelled between the laminating sheet 27 and the backing card 26.

The application of pressure via the top platen 32 and resilient sheet 28 is not essential where a powerful vacuum source which provides vacuum suction extracts all air through pores in the flowers 10/leaves 11, the backing card 26 and any gaps between the laminating sheet 27 and backing card 26, and heating coils 33 heat the laminating sheet 27 to its laminating temperature range.

Tests have shown that the color of the flowers and leaves is stable with time, and the lamination step between 80° C. and 140° C. (subject to the different types of flowers or vegetable matter being laminated) prevents (or limits) the degradation of the color in the vegetable matter being laminated.

As the colors are maintained, and the laminating sheet is molded around the matter to give a three-dimensional effect, the resultant cards 12 are very attractive and much more appealing than those produced by conventional laminating techniques.

The selection of materials to be laminated, the backing material, the drying conditions and laminating conditions can be varied to produce the most desirable results.

Various other changes and modifications may be made to the embodiment described without departing from the scope of the present invention as defined in the appended claims.

We claim:

1. A method of laminating plants and parts of plants, flowering leaves, grasses and other flora, between a backing sheet and a thermoseal laminating sheet having a heat-releasable adhesive on its inner surface facing the backing sheet, comprising the steps of:

predrying a vegetable matter selected from the group consisting of plants and parts of plants, flowering leaves, grasses and other flora in a drying press under pressure to produce a dried vegetable matter, said predrying being carried out under conditions of 40-60% relative humidity, 15° C. to 35° C. temperatures, and with air flowing relatively closely to the vegetable matter to facilitate the predrying process;

placing the dried vegetable matter on the backing sheet in a desired pattern and placing the laminating sheet over the vegetable matter to form an assembly;

placing a layer of resilient material selected from the group consisting of thermal foam, sponge rubber and plastics directly over said laminating sheet, and applying pressure and heat to the resilient material and laminating sheet under controlled conditions so that the laminating sheet is directly contacted and pressed by said layer of resilient material onto the vegetable matter without compressing the same, and is pressed into said backing sheet, with the heat and pressure causing the laminating sheet to be laminated to the backing sheet.

2. The method according to claim 1, wherein the vegetable matter is predried between cardboard sheets under pressure for 3-60 days, with said cardboard sheets being perforated or corrugated to permit the flow of air therethrough to enhance the predrying process.

3. The method according to claim 1, wherein the backing sheet comprises paper, cardboard or timber, and the laminating sheet is a plastics or synthetic material sheet which is transparent or semi-opaque.

4. The method according to claim 1, further including a laminating press having an upper platen and a lower platen, and wherein the assembly is placed on the lower platen, and the upper platen is moved to press down the resilient material to cause the laminating sheet to mold around the vegetable matter.

5. The method according to claim 2, wherein the pressure is applied for one to five minutes, and heat is applied evenly to the assembly by heating at least one of the platens to a temperature range of 80° to 160° C.

6. The method as claimed in claim 1, wherein the platen is heated to the temperature range of 100° to 140° C.

7. The method according to claim 1, wherein said resilient material has a fine texture, and wherein the pressure and temperature are applied until the laminating sheet reaches its laminating temperature and the texture of the resilient material has been imprinted onto the laminating sheet to remove gloss from the laminating sheet to produce a non-reflective effect.

8. The method according to claim 7, wherein the resilient material molds the laminating sheet onto the vegetable matter and removes air between the backing sheet and the laminating sheet.

9. The method according to claim 4, wherein a vacuum is also applied to the assembly to cause the laminating sheet to mold onto the vegetable matter and to remove air between the backing sheet and the laminating sheet.

10. The method according to claim 1, wherein the pressure on the assembly is a vacuum or negative pressure which causes the laminating sheet to mold onto the vegetable matter and to remove air between the backing sheet and the laminating sheet.

* * * * *